United States Patent
Ringk et al.

(10) Patent No.: US 12,255,361 B2
(45) Date of Patent: Mar. 18, 2025

(54) FUEL CELL UNIT

(71) Applicant: Robert Bosch GmbH, Stuttgart (DE)

(72) Inventors: Andreas Ringk, Bamberg (DE); Anton Ringel, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 694 days.

(21) Appl. No.: 17/616,261

(22) PCT Filed: May 7, 2020

(86) PCT No.: PCT/EP2020/062700
§ 371 (c)(1),
(2) Date: Dec. 3, 2021

(87) PCT Pub. No.: WO2020/244879
PCT Pub. Date: Dec. 10, 2020

(65) Prior Publication Data
US 2022/0320532 A1    Oct. 6, 2022

(30) Foreign Application Priority Data

Jun. 5, 2019 (DE) ............. 10 2019 208 171.1

(51) Int. Cl.
| | |
|---|---|
| *H01M 8/0273* | (2016.01) |
| *H01M 8/0284* | (2016.01) |
| *H01M 8/0286* | (2016.01) |
| *H01M 8/1004* | (2016.01) |
| *H01M 8/10* | (2016.01) |

(52) U.S. Cl.
CPC ....... *H01M 8/0273* (2013.01); *H01M 8/0284* (2013.01); *H01M 8/0286* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2010/0285394 A1* | 11/2010 | Lee .................. | H01M 8/0282 429/509 |
| 2010/0331165 A1 | 12/2010 | Lee et al. | |
| 2015/0318563 A1 | 11/2015 | Kuribayashi et al. | |

FOREIGN PATENT DOCUMENTS

| | | |
|---|---|---|
| CN | 1649186 A | 8/2005 |
| CN | 101009382 A | 8/2007 |

(Continued)

OTHER PUBLICATIONS

Translation of International Search Report for Application No. PCT/EP2020/062700 dated Aug. 18, 2020 (3 pages).

*Primary Examiner* — Alix E Eggerding
(74) *Attorney, Agent, or Firm* — Michael Best & Friedrich LLP

(57) ABSTRACT

Fuel cell unit in the form of a fuel cell stack for producing electrical energy in an electrochemical manner, comprising fuel cells, the fuel cells each comprising a proton exchange membrane, an anode, a cathode, a gas diffusion layer, a bipolar plate, at least one fluid channel for the passage of a fluid, at least one seal (11) composed of a sealing material (42) for sealing off the at least one fluid channel (37), wherein particles (41) composed of a particle material (43) are arranged in the sealing material (42) of the at least one seal (11), for the purpose of extending the diffusion path (38) of the fluid which is sealed off by the at least one seal (11).

20 Claims, 8 Drawing Sheets

(56) References Cited

FOREIGN PATENT DOCUMENTS

| | | |
|---|---|---|
| CN | 101536230 A | 9/2009 |
| CN | 101662031 A | 3/2010 |
| CN | 102804466 A | 11/2012 |
| CN | 104661814 A | 5/2015 |
| CN | 104798233 A | 7/2015 |
| CN | 105453319 A | 3/2016 |
| DE | 60006211 T2 | 7/2004 |
| DE | 102004042012 A1 | 3/2006 |
| DE | 102006053569 A1 | 3/2008 |
| DE | 102017200289 A1 | 7/2018 |
| EP | 1566583 A1 | 8/2005 |
| EP | 1843419 A1 | 10/2007 |
| EP | 2104171 A1 | 9/2009 |
| JP | 2013175368 A | 9/2013 |
| KR | 2009052566 A | 5/2009 |
| WO | 2020074169 A1 | 4/2020 |

\* cited by examiner

FUEL CELL UNIT

BACKGROUND OF THE INVENTION

The present invention relates to a fuel cell unit and a process for producing a fuel cell unit.

As electrochemical cells, fuel cell units convert fuel and oxidant which are continuously fed in into electric energy by means of redox reactions at an anode and a cathode. Fuel cells are used in a variety of stationary and mobile applications, for example in houses without a connection to a power grid or in motor vehicles, in rail vehicles, in aircraft, in spaceflight and in watercraft.

In fuel cell units, it is necessary to convey fluids, e.g. water, air, oxygen, hydrogen or methane, through fluid channels such as channels, gas spaces and conduits. These fluid channels are sealed using seals made of a sealing material. Owing to the relatively high coefficient of diffusion of the sealing material used in the seals, considerable diffusion occurs. A critical aspect of the seals used is, in particular, the long-term stability in respect of diffusion, so that diffusion which interferes in or is damaging for the operation of the fuel cell unit does occur after operation for a number of years. Fuel cell units thus do not have the necessary long-term reliability of from 10 to 15 years when used in, for example, motor vehicles.

DE 10 2006 053 569 A1 discloses a sealing structure on a separating piece of a fuel cell.

A method for orienting geometrically anisotropic, particulate materials in media by means of an electric field is known from DE 10 2004 042 012 A1.

SUMMARY OF THE INVENTION

The invention provides a fuel cell unit as fuel cell stack for electrochemically generating electric energy, comprising fuel cells, the fuel cells respectively comprising a proton exchange membrane, an anode, a cathode, a gas diffusion layer, a bipolar plate, at least one fuel channel for passage of a fluid, at least one seal composed of a sealing material for sealing the at least one fluid channel, wherein particles composed of a particle material are arranged in the sealing material of the at least one seal in order to lengthen the diffusion path of the fluid sealed off by the at least one seal. Owing to the lengthening of the diffusion path and the great long-term stability of the particle material of the particles, the seals have a very small, average coefficient of diffusion and a high long-term stability of, for example, more than 10 or 15 years.

In an additional variant, the coefficient of diffusion of the particle material of the particles in a seal for the fluid to be sealed off by the particular seal is smaller than the coefficient of diffusion of the sealing material for the fluid to be sealed off by the particular seal. In particular, the coefficient of diffusion of the particle material is less than 90%, 70%, 60%, 50%, 40% or 30% of the coefficient of diffusion of the sealing material. Different coefficients of diffusion thus occur in the seal; in particular, the coefficients of diffusion differ by at least 10%, 20%, 30%, 50%, 100% or 200% within the seal.

The aspect ratio of the particles is advantageously greater than 1, 2, 5, 7 or 10. For example, at a maximum diameter in the direction of an imaginary plane spanning the particle of 300 µm and a thickness of the particle perpendicular to the imaginary plane of 30 µm, the aspect ratio is 300:30=10: 1=10.

In an additional variant, the particles have a platelet shape or needle shape.

In a supplementary embodiment, the imaginary planes spanning the particles are oriented essentially perpendicular to an ideal direction of diffusion in the particular seal. "Essentially perpendicular" means that the imaginary plane is oriented perpendicular to an ideal direction of diffusion with a deviation of less than 30°, 20°, 10° or 5°. An ideal direction of diffusion is a straight direction ideally represented by semi-straight lines with a minimum path of the fluid to be sealed off through the seal without taking the particles into account. The particles are essentially disk-shaped and/or plate-shaped and/or needle-shaped and thus span an imaginary plane in each case.

The particles are preferably anisotropic.

In a further embodiment, the particle material comprises a polarizable material and/or a material having a dipole nature, so that the particles overall have a dipole nature for orientation of the particles in an electric field.

In a supplementary embodiment, the particle material comprises a ferromagnetic material for orientation of the particles in a magnetic field.

The maximum diameter of the particles is advantageously less than 1000 µm, 700 µm, 500 µm or 300 µm.

In an additional embodiment, the maximum diameter of the particles is greater than 5 µm, 10 µm, 100 µm or 200 µm.

In a supplementary variant, the ratio of the proportion by volume and/or the proportion by mass between the particle material and the sealing material is in the range from 1% to 95%, preferably from 3% to 80%, in particular from 5% to 70%. For example, at a total volume of the particles and/or the particle material in a seal of 5 ml and a volume of the sealing material of 20 ml, the ratio is thus 5/20=25%.

Process according to the invention for producing a fuel cell unit, comprising the steps: provision of components for fuel cells, provision of at least one seal composed of a sealing material, assembly of the components of the fuel cells to give the fuel cells so that at least one fluid channel is sealed by the at least one seal, assembly of the fuel cells to give the fuel cell unit, wherein the seal is provided with particles composed of a particle material being arranged in the sealing material of the at least one seal in order to lengthen the diffusion path of the fluid sealed off by the seal.

In an additional embodiment, the particles have a maximum diameter in a first direction and have a minimum diameter in a second direction and the first and second directions are oriented perpendicular to one another and in an imaginary plane spanned by the particles and the particles in the seal are oriented by an electric and/or magnetic field so that the first and second directions are oriented essentially perpendicular to an ideal direction of diffusion in the diffusion path in the particular seal.

In a further embodiment, the at least one seal is, in particular before assembly of the components of the fuel cells, arranged in the electric and/or magnetic field and the particles perform movements, in particular rotational movements, in the sealing material during arrangement of the at least one seal in the electric and/or magnetic field. The rotational movement brings about orientation of the particles in the seal, i.e. the particles as per the description in this patent application are oriented in the seal.

In a supplementary embodiment, the sealing material of the at least one seal is cured after orientation of the particles in the at least one seal.

Preference is given to at least one fluid channel being sealed by the at least one seal during assembly of the fuel cells to give the fuel cell unit.

In a further embodiment, the particles have a maximum diameter in a first direction and a minimum diameter in a second direction and the first and second directions are oriented perpendicular to one another and in a plane and the particles are arranged in the seal so that the first and second directions are oriented essentially perpendicular to an ideal direction of diffusion in the particular seal.

In an additional variant, the particles are at least partly, in particular entirely, formed by a geometrically anisotropic and/or particulate material. "Anisotropic" means, in particular, that the particles have different physical and/or chemical properties in various directions in space because of the geometry and/or the particle material of the particles.

The layer to be sealed off is advantageously a bipolar plate and/or a housing and/or a wall of a channel and/or a wall of a feed conduit and/or a wall of a discharge conduit.

In a supplementary variant, the particles comprise sheet silicates and/or glass and/or silicon oxide and/or iron oxide and/or at least one metal and/or titanium dioxide and/or aluminum oxide and/or organic materials, for example liquid crystals, as particle material.

In a further embodiment, a fuel cell unit as described in the present patent application is produced by the process for producing a fuel cell unit described in the present patent application and/or the process is carried out as per at least one feature of the fuel cell unit described in the present patent application.

In a supplementary variant, the fuel cell unit described in the present patent application has been produced by the process described in the present patent application.

In a further embodiment, the imaginary planes spanned by the particles are oriented essentially perpendicular to the ideal direction of diffusion in the particular seal during arrangement of the seal in the electric and/or magnetic field.

In an additional variant, proton exchange membranes, anodes, cathodes, gas diffusion layers and bipolar plates are provided for components for fuel cells.

In a further variant, the fuel cell unit comprises at least one connecting device, in particular a plurality of connecting devices, and clamping elements.

The components for fuel cells are advantageously proton exchange membranes, anodes, cathodes, gas diffusion layers and bipolar plates.

In a further embodiment, the connecting device is configured as a pin and/or is rod-shaped.

The clamping elements are advantageously configured as clamping plates.

Fuel cell system according to the invention, in particular for a motor vehicle, comprising a fuel cell unit as fuel cell stack comprising fuel cells, a compressed gas store for storing gaseous fuel, a gas transport device for conveying a gaseous oxidant to the cathodes of the fuel cells, wherein the fuel cell unit is configured as a fuel cell unit as described in the present patent application.

In a further variant, the gas transport device is configured as a blower or a compressor.

In particular, the fuel cell unit comprises at least three, four, five or six connecting devices.

In a further embodiment, the clamping elements are plate-shaped and/or disk-shaped and/or flat and/or configured as a grid.

The fuel is preferably hydrogen, reformer gas or natural gas.

The fuel cells are advantageously essentially flat and/or disk-shaped.

In a supplementary variant, the oxidant is oxygen-enriched air or pure oxygen.

A fuel cell unit is preferably a PEM fuel cell unit comprising PEM fuel cells.

BRIEF DESCRIPTION OF THE DRAWINGS

Working examples of the invention are described in more detail below with reference to the accompanying drawings. The drawings show.

DETAILED DESCRIPTION

Figure 1:
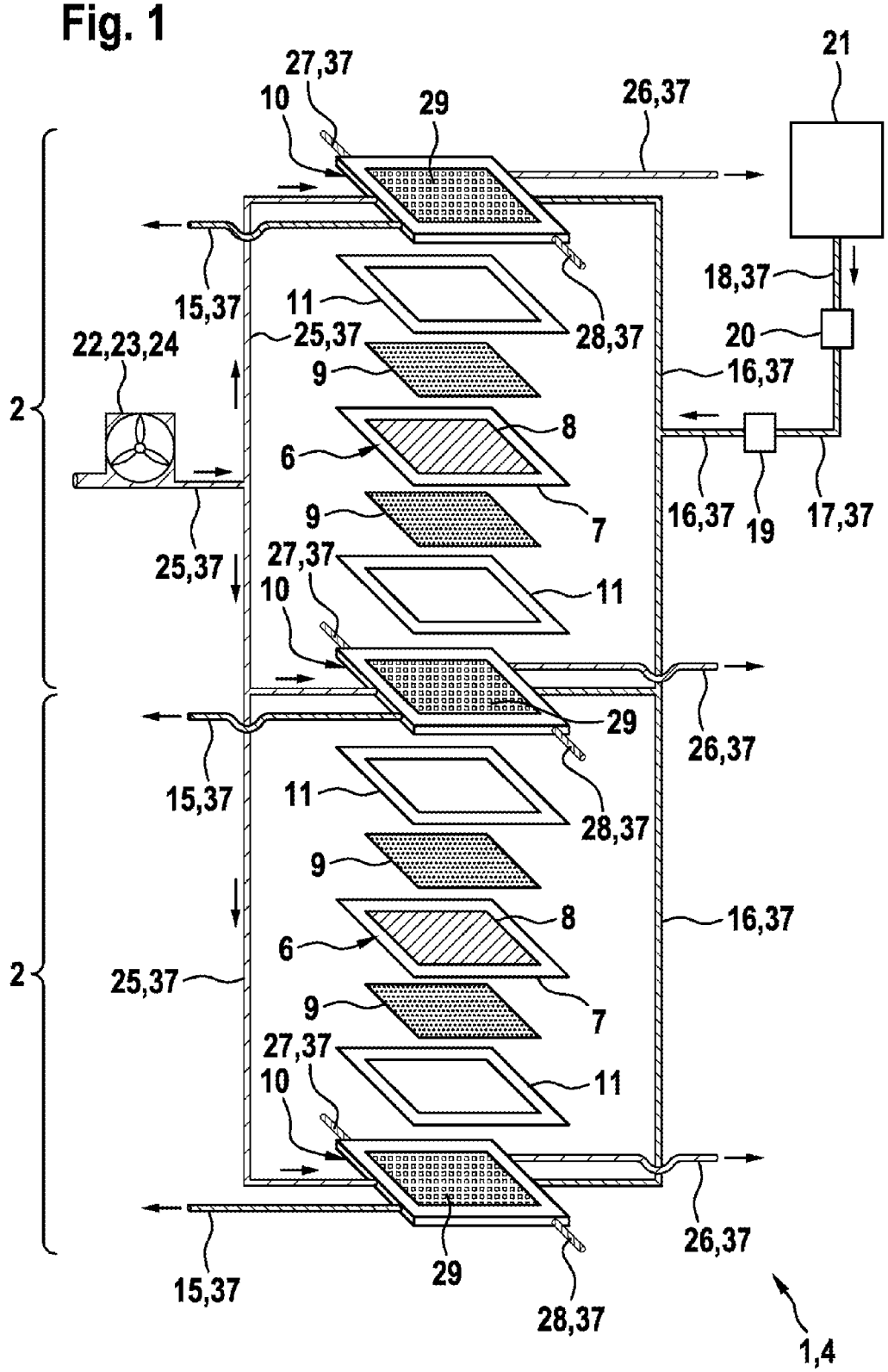
FIG. 1 a greatly simplified exploded view of a fuel cell system with components of a fuel cell, FIG. 2 a perspective view of part of a fuel cell, FIG. 3 a longitudinal section through a fuel cell, FIG. 4 a perspective view of a fuel cell unit as fuel cell stack, i.e. a fuel cell stack, FIG. 5 a section through a seal known from the prior art with a section plane parallel to a diffusion path of a fluid to be sealed off by the seal, FIG. 6 a section through a seal in a first working example in a fuel cell unit according to the invention with the section plane parallel to the ideal direction of diffusion of the fluid to be sealed off by the seal, FIG. 7 a section through a seal in a second working example in a fuel cell unit according to the invention with the section plane parallel to the ideal direction of diffusion of the fluid to be sealed off by the seal, FIG. 8 a seal applied to a support layer with the particles integrated into the seal before orientation of the particles in an electric and/or magnetic field, FIG. 9 the seal applied to the support layer with the particles integrated into the seal during arrangement in the electric and/or magnetic field and after orientation of the particles, FIG. 10 the seal applied to the support layer with the particles integrated into the seal after orientation of the particles and during curing of a sealing material of the seal, FIG. 11 a seal with oriented integrated particles between a first layer to be sealed off and a second layer to be sealed off in the assembled fuel cell unit, FIG. 12 a simplified perspective view of the particle, FIG. 13 a simplified side view of the particle of FIG. 12 and FIG. 14 a simplified flow diagram of a process for producing fuel cell units.
Figure 2:
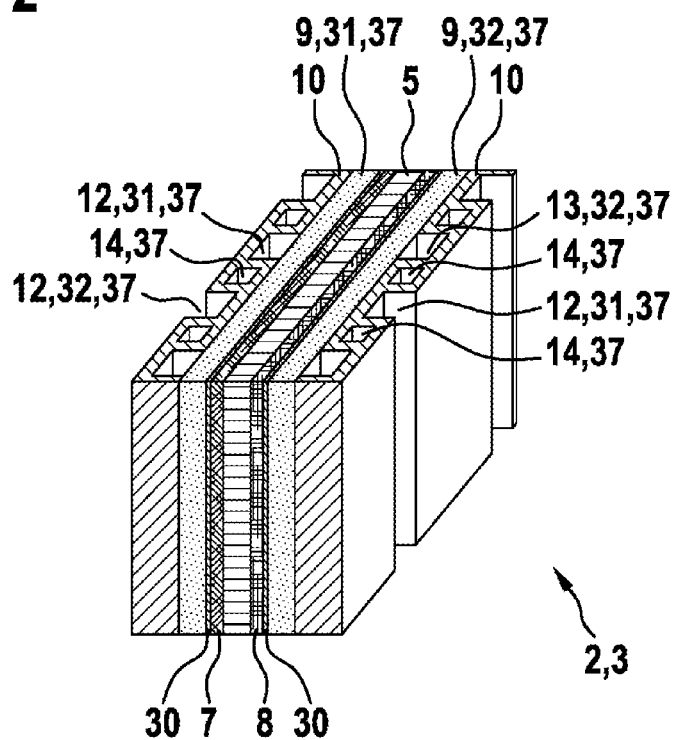
Figure 3:
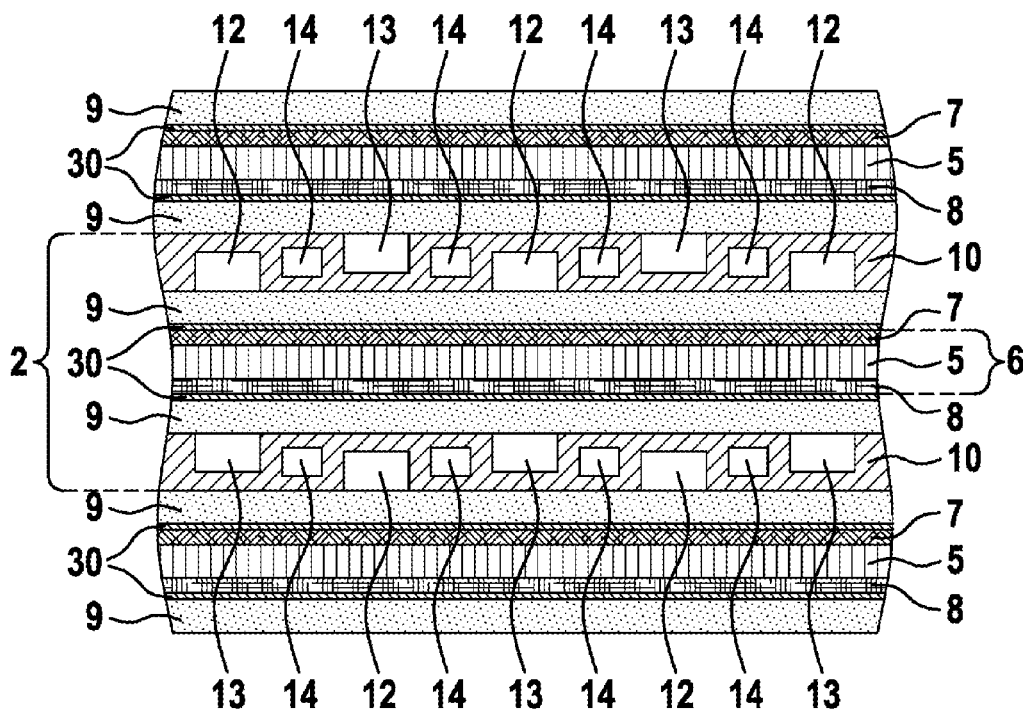

FIGS. 1 to 3 depict the basic structure of a fuel cell 2 as a PEM fuel cell 3 (polymer electrolyte fuel cell 3). The principle of fuel cells 2 is that electric energy or electric current is produced by means of an electrochemical reaction. Hydrogen is conducted as gaseous fuel to an anode 7 and the anode 7 forms the minus pole. A gaseous oxidant, namely air with oxygen, is supplied to a cathode 8, i.e. the oxygen in the air provides the required gaseous oxidant. A reduction (uptake of electrons) takes place at the cathode 8. The oxidation as loss of electrons occurs at the anode 7.

The redox equations of the electrochemical processes are:

$$O_2 + 4H^+ + 4e^- \rightarrow 2H_2O \qquad \text{Cathode:}$$

$$2H_2 \rightarrow 4H^+ + 4e^- \qquad \text{Anode:}$$

$$2H_2 + O_2 \rightarrow 2H_2O \quad \text{Overall reaction equation of cathode and anode:}$$

The difference between the standard potentials of the electrode pairs under standard conditions as reversible fuel cell voltage or open circuit voltage of the fuel cell 2 under no load is 1.23 V. This theoretical voltage of 1.23 V is not achieved in practice. In the rest state and at small currents, voltages above 1.0 V can be achieved and during operation at higher currents, voltages between 0.5 V and 1.0 V are attained. The connection series of a plurality of fuel cells 2, in particular a fuel cell unit 1 as fuel cell stack 1 of a plurality of superposed fuel cells 2 has a higher voltage which corresponds to the number of fuel cells 2 multiplied by the individual voltage per fuel cell 2.

The fuel cell 2 additionally comprises a proton exchange membrane 5 (PEM) which is arranged between the anode 7 and the cathode 8. The anode 7 and cathode 8 are configured as layers or disks. The PEM 5 functions as electrolyte, catalyst support and separator for the reaction gases. The PEM 5 additionally functions as electrical insulator and prevents an electric short circuit between the anode 7 and cathode 8. In general, proton-conducting films composed of perfluorinated and sulfonated polymers and having a thickness of from 50 μm to 150 μm are used. The PEM 5 conducts the proton $H^+$ and blocks ions other than protons $H^+$ to a substantial extent, so that charge transport can occur on the basis of the protons $H^+$ owing to the permeability of the PEM 5. The PEM 5 is essentially impermeable to the reaction gases oxygen $O_2$ and hydrogen $H_2$, i.e. it blocks the flow of oxygen $O_2$ and hydrogen $H_2$ between a gas space 31 at the anode 7 with fuel hydrogen $H_2$ and the gas space 32 at the cathode H with air or oxygen $O_2$ as oxidant. The proton conductivity of the PEM 5 increases with increasing temperature and increasing water content.

The electrodes 7, 8 as the anode 7 and cathode 8 are present on the two sides of the PEM 5, in each case facing the gas spaces 31, 32. A unit made up of the PEM 5 and the electrodes 6, 7 is referred to as membrane electrode assembly 6 (MEA). The electrodes 7, 8 are pressed together with the PEM 5. The electrodes 6, 7 are platinum-containing carbon particles which are bound to PTFE (polytetrafluoroethylene), FEP (fluorinated ethylene-propylene copolymer), PFA (perfluoroalkoxy), PVDF (polyvinylidene fluoride) and/or PVA (polyvinyl alcohol) and are pressed hot into microporous carbon fiber, glass fiber or polymer fiber mats. A catalyst layer 30 is normally applied to the electrodes 6, 7 on the side facing the gas spaces 31, 32. The catalyst layer 30 at the gas space 31 with fuel at the anode 7 comprises nanodisperse platinum-ruthenium on graphitized carbon black particles which are bound to a binder. The catalyst layer 30 at the gas space 32 with oxidant at the cathode 8 analogously comprises nanodisperse platinum. As binder, use is made of, for example, Nafion®, a PTFE emulsion or polyvinyl alcohol.

A gas diffusion layer 9 (GDL) is present on the anode 7 and the cathode 8. The gas diffusion layer 9 on the anode 7 distributes the fuel from channels 12 for fuel uniformly over the catalyst layer 30 on the anode 7. The gas diffusion layer 9 on the cathode 8 distributes the oxidant from channels 13 for oxidant uniformly over the catalyst layer 30 on the cathode 8. The GDL 9 additionally serves to take off water of reaction in the reverse direction to the flow direction of the reaction gases, i.e. in a direction from the catalyst layer 30 to the channels 12, 13. Furthermore, the GDL 9 keeps the PEM 5 moist and conducts the current. The GDL 9 is, for example, made of a hydrophobicized carbon paper and a bonded carbon powder layer.

A bipolar plate 10 is present on the GDL 9. The electrically conductive bipolar plate 10 serves as current collector, for conducting away water and for conducting the reaction gases through a channel structure 29 and/or a flow field 29 and for conducting away the waste heat which occurs, in particular, in the exothermic electrochemical reaction at the cathode 8. To conduct away the waste heat, channels 14 for passage of a liquid or gaseous coolant are incorporated in the bipolar plate 10. The channel structure 29 at the gas space 31 for fuel is formed by channels 12. The channel structure 29 at the gas space 32 for oxidant is formed by channels 13. As material for the bipolar plates 10, use is made of, for example, metal, conductive polymers and composite materials or graphite.

Figure 4:
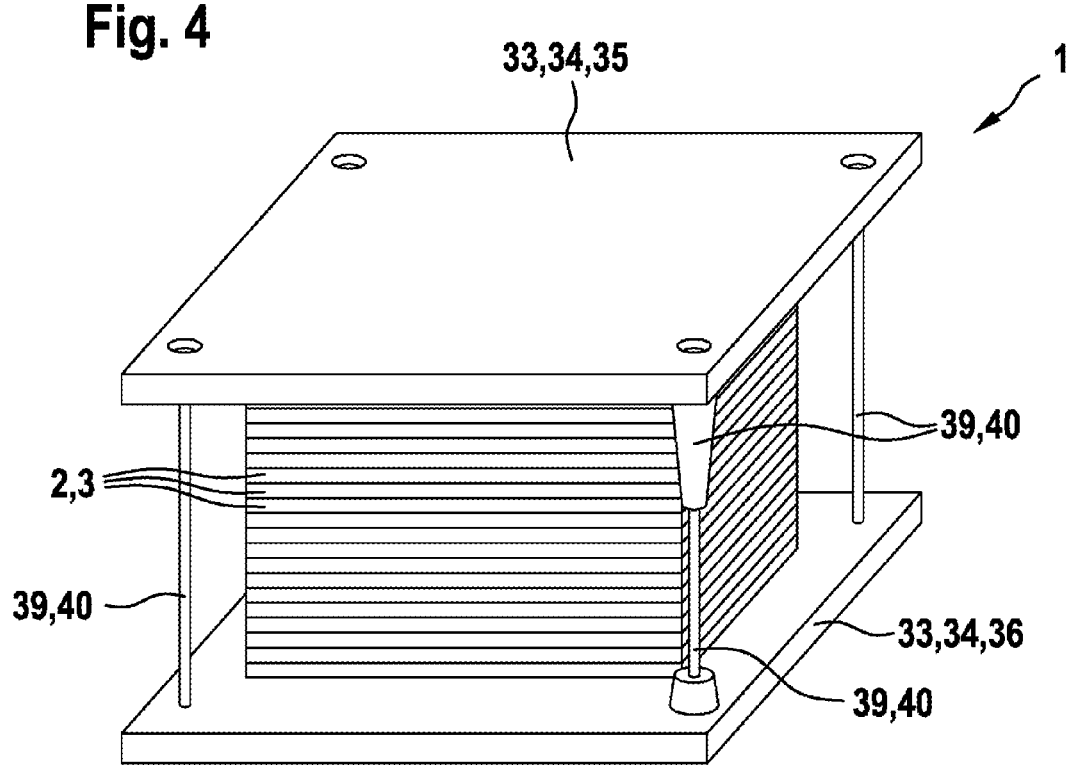

A plurality of fuel cells 2 are arranged above one another in a fuel cell unit 1 and/or a fuel cell stack 1 (FIG. 4). FIG. 1 depicts an exploded view of two superposed fuel cells 1. A seal 11 forms a fluid-tight seal against the gas spaces 31, 32. Hydrogen $H_2$ as fuel is stored at a pressure of, for example, from 350 bar to 700 bar in a compressed gas store 21 (FIG. 1). From the compressed gas store 21, the fuel is conveyed through a high-pressure conduit 18 to a pressure reducer 20 in order to reduce the pressure of the fuel in an intermediate-pressure conduit 17 to from about 10 bar to 20 bar. From the intermediate-pressure conduit 17, the fuel is conveyed to an injector 19. At the injector 19, the pressure of the fuel is reduced to a blowing-in pressure in the range from 1 bar to 3 bar. From the injector 19, the fuel is introduced into a feed conduit 16 for fuel (FIG. 1) and from the feed conduit 16 into the channels 12 for fuel, which form the channel structure 29 for fuel. The fuel thus flows through the gas space 31 for the fuel. The gas space 31 for the fuel is formed by the channels 12 and the GDL 9 at the anode 7. After flowing through the channels 12, the fuel which has not been consumed in the redox reaction at the anode 7 and possibly water from controlled moistening of the anode 7 are discharged from the fuel cells 2 through a discharge conduit 15.

A gas transport device 22, for example configured as a blower 23 or a compressor 24, conveys air from the surroundings as oxidant into a feed conduit 25 for oxidant. From the feed conduit 25, the air is introduced into the channels 13 for oxidant, which form a channel structure 29 at the bipolar plates 10 for oxidant, so that the oxidant flows through the gas space 32 for the oxidant. The gas space 32 for the oxidant is formed by the channels 13 and the GDL 9 at the cathode 8. After flowing through the channels 13 or the gas space 32 for the oxidant 32, the oxidant which has not been consumed at the cathode 8 and the water of reaction formed at the cathode 8 as a result of the electrochemical redox reaction is discharged from the fuel cells 2 through a discharge conduit 26. A feed conduit 27 serves to introduce coolant into the channels 14 for coolant and a discharge conduit 28 serves to discharge the coolant which has been conveyed through the channels 14. The feed conduits and discharge conduits 15, 16, 25, 26, 27, 28 are depicted as separate conduits in FIG. 1 for reasons of simplicity and can actually be constructed differently, for example as holes in a frame (not shown) or as flush holes at the end region (not shown) of superposed bipolar plates 10. The fuel cell stack 1 together with the pressurized gas store 21 and the gas transport device 22 forms a fuel cell system 4. The feed conduits and discharge conduits 15, 16, 17, 18, 25, 26, 27, 28 and the channels 12, 13, 14 and also the gas space 31 for fuel and the gas space 32 for oxidant each form a fluid channel 37 for passage of a fluid.

In the fuel cell unit 1, the fuel cells 2 are arranged between two clamping elements 33 as clamping plates 34. An upper clamping plate 35 lies against the uppermost fuel cell 2 and a lower clamping plate 36 lies against the bottommost fuel cell 2. The fuel cell unit 1 comprises approximately 300-400 fuel cells 2, which are not all depicted in FIG. 4 in the interests of simplicity of depiction. The clamping elements 33 exert a compressive force on the fuel cells 2, i.e. the upper clamping plate 35 lies against the uppermost fuel cell 2 with a compressive force and the lower clamping plate 36 lies against the lowermost fuel cell 2 with a compressive force. The fuel cell stack 2 is thus clamped in order to ensure freedom from leaks of the fuel, the oxidant and the coolant, in particular due to the elastic seal 11, and also to keep the electrical contact resistance within the fuel stack 1 as small as possible. To clamp the fuel cells 2 by means of the clamping elements 33, four connecting devices 39 configured as pins 40, which are under tensile stress, are arranged on the fuel cell unit 1. The four pins 40 are fixed to the clamping plates 34.

Figure 5:
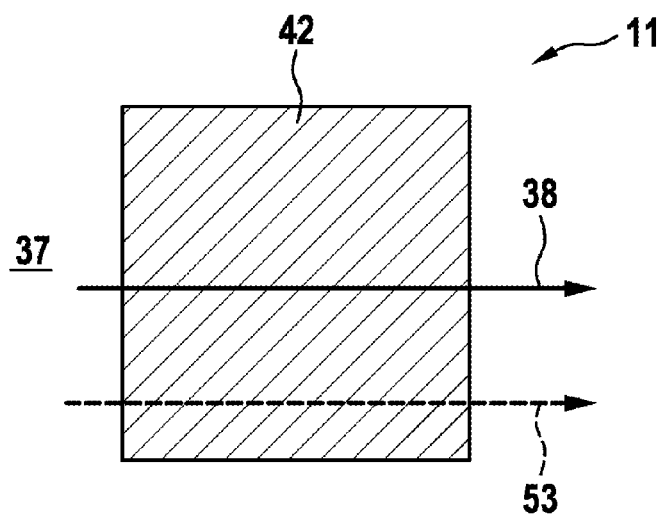

FIG. 5 depicts a section with a section plane parallel to a diffusion path 38 for a fluid to be sealed off through a seal 11 which is known from the prior art and is composed of a sealing material 42. Solids, too, have a coefficient of diffusion, so that the fluid can diffuse along a straight diffusion path 38 as ideal diffusion direction 53 through the sealing material 42. Owing to the straight diffusion path, the fluid diffusing through the sealing material 42 can cover a short minimal distance, so that a relatively large volume flow of fluid can diffuse through the sealing material 42.

Figure 6:
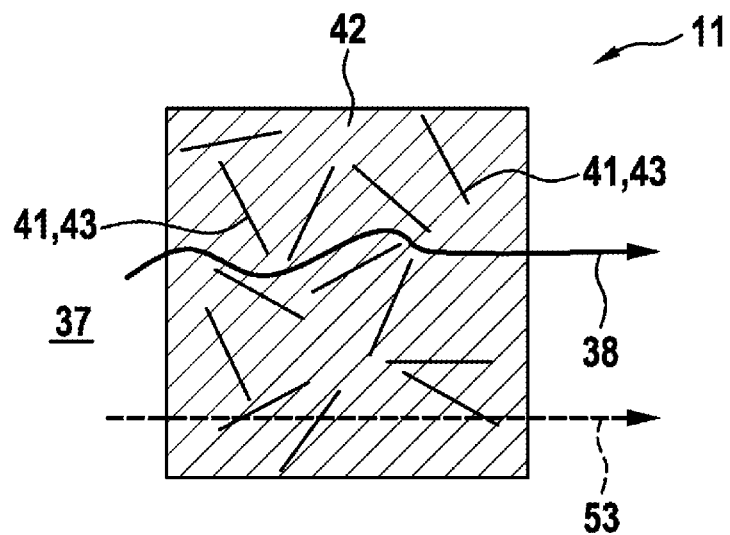

FIG. 6 shows a section with a section plane parallel to the ideal diffusion direction 53 for a fluid to be sealed off through a seal 11 in a first working example of a fuel cell unit 1 according to the invention. The fluid to be sealed off, for example the fuel hydrogen $H_2$, the oxidant air or a liquid coolant, for example water containing antifreeze, is conveyed through a fluid channel 37 and the fluid channel 37 is sealed by the seal 11. The seal 11 comprises a sealing material 42, for example a polymer such as PPS (polyphenylene sulfide as heat-resistant thermoplastic polymer), EPDM (ethylene-propylene-diene rubber as synthetic rubber) or adhesive and also particles 41 of a particle material 43. The diffusion coefficient of the particle material 43 is significantly lower than the diffusion coefficient of the sealing material 42, so that the fluid to be sealed off by the seal 11 can essentially not diffuse through the particles 41, so that the diffusion path 38 of the fluid runs virtually exclusively in the sealing material 42. The particles 41 thus form a diffusion barrier for the fluid and the diffusion path 38 therefore runs around the particles 41. Thus, the seal 11 of FIG. 6 has a longer diffusion path 38 than in the case of the seal 11 shown in FIG. 5. As a result of the longer diffusion path 38, the seal 11 has a smaller total average coefficient of diffusion than the seal 11 of the prior art shown in FIG. 5.

Figure 7:
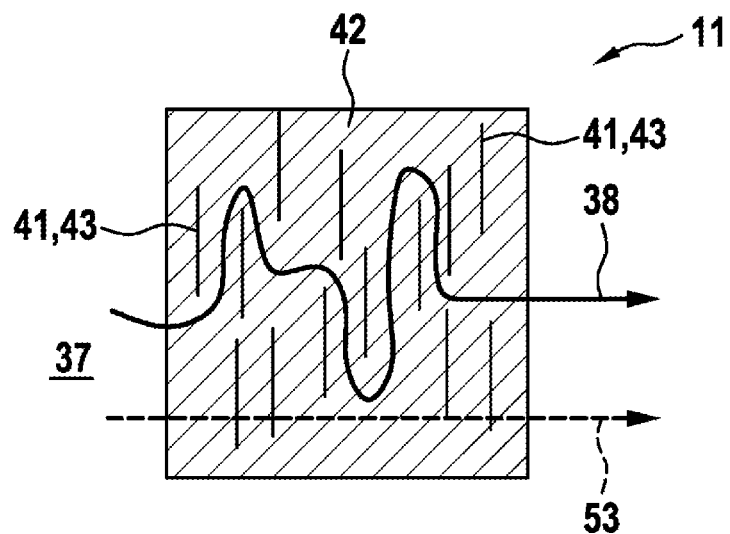
Figure 8:
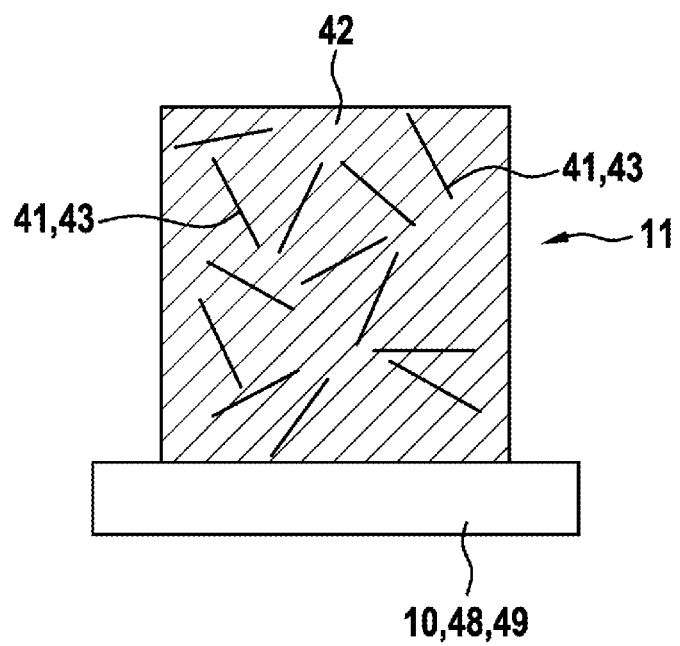
Figure 12:
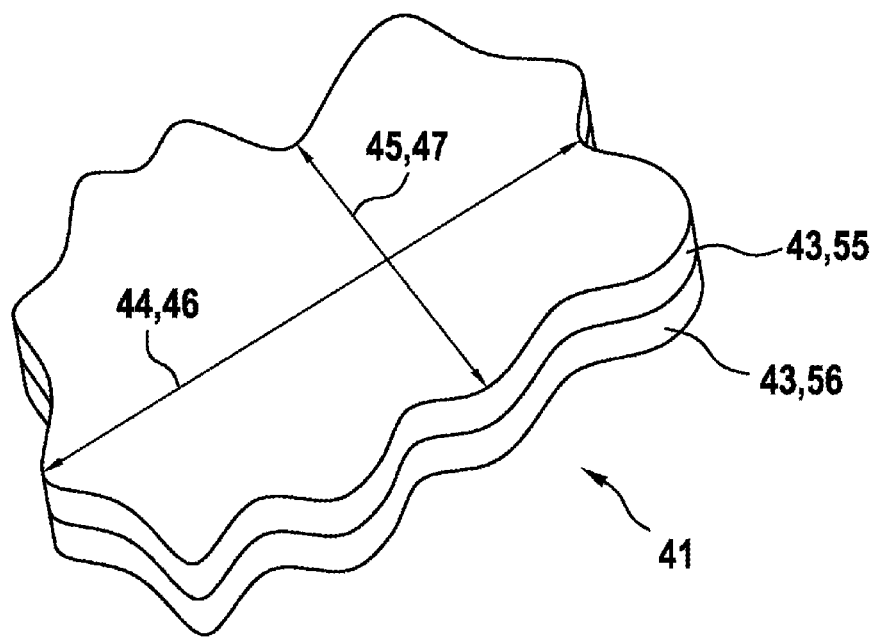
Figure 13:
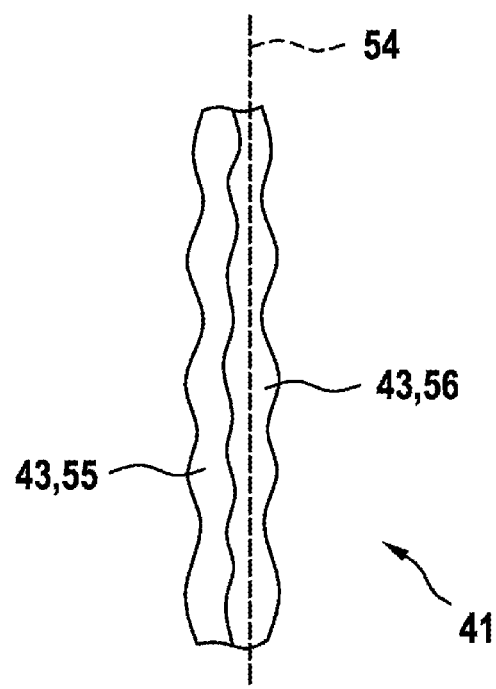
Figure 14:
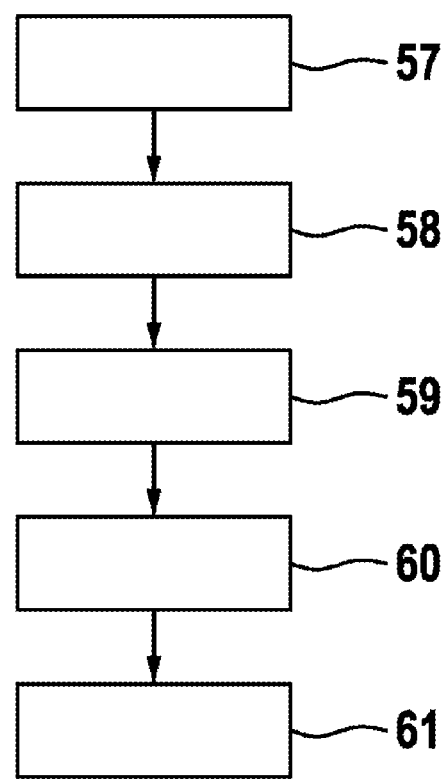

FIG. 7 shows a section with a section plane parallel to the ideal diffusion direction 53 for a fluid to be sealed off through a seal 11 in a second working example of a fuel cell unit 1 according to the invention. The particles 41 are, as in FIG. 6, disk-shaped or platelet-shaped (FIG. 12) and have a maximum diameter 46 in a first direction 44 and a minimum diameter 47 in a second direction 45. The first and second directions 44, 45 are perpendicular to one another and lie in an imaginary plane 54 spanned by the disk-shaped particle 41 (FIG. 13). The maximum diameter is 500 μm and the minimum diameter is 250 μm, so that the particles 41 have an aspect ratio of 2:1 within the imaginary plane 54. The thickness perpendicular to the imaginary plane 54 is 20 μm, so that the aspect ratio is 500/20=25. The first and second directions 44, 45 and the imaginary planes 54 spanned by the particles 41 are oriented perpendicular to the ideal diffusion direction 53 for achieving low diffusion. The fluid is thus forced to go along a very long diffusion path 38 through the seal 11, so that the seal 11 overall has a smaller average coefficient of diffusion. Only very little fluid can therefore diffuse through the seal 11. The particles 41 are made up of an orientation layer 55 and a diffusion barrier layer 56. The orientation layer 55 serves to orient the particles in an electric or magnetic field. When the particles 41 are arranged in a magnetic field, the orientation layer 55 is, for example, a ferromagnetic layer composed of γ-$Fe_2O_3$, magnesite, iron, cobalt or nickel. When the particles 41 are arranged in an electric field, the orientation layer 55 is made of a polarizable material or a material having dipole properties. These are, for example, materials composed of molecules having polar atom bonding in which the molecules have an asymmetric structure, for example aluminum chloride ($AlCl_3$). As diffusion barrier layer 56, it is possible to use, for example, glass or a metal layer, for example iron, brass or copper, having a very small coefficient of diffusion.

Figure 9:
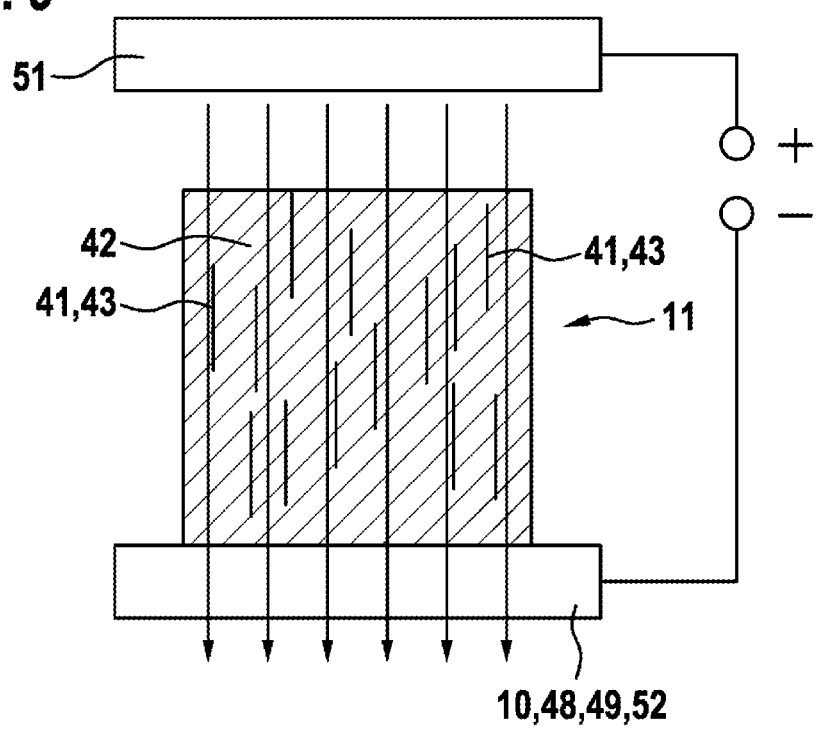
Figure 10:
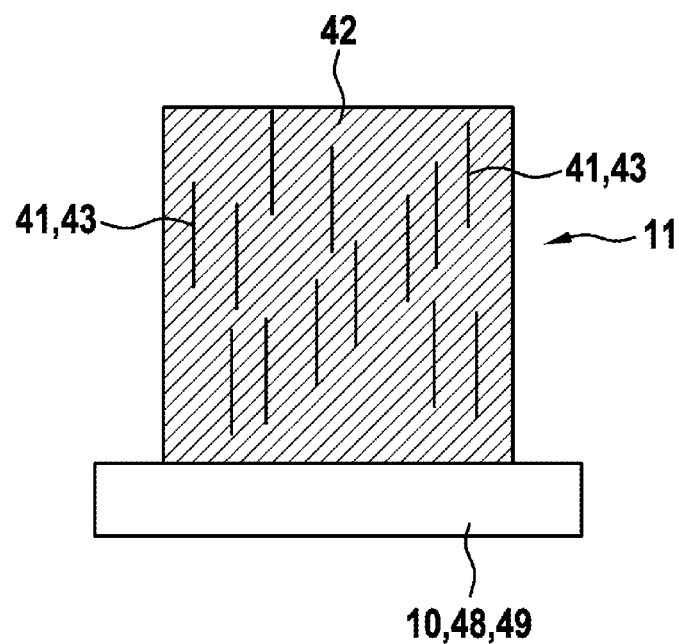
Figure 11:
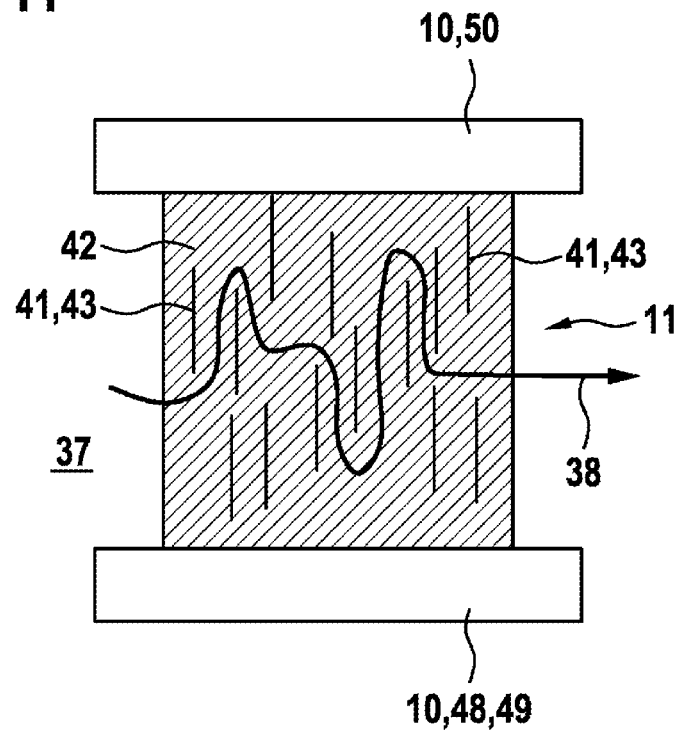

The steps for producing a seal 11 comprising the oriented particles 41 are shown in FIGS. 8 to 11. Provision 57 of an uncured sealing material 42 comprising particles 41 is firstly carried out. A sealing material 42 comprising integrated particles 41 is applied 58, e.g. by means of a dispenser, to a support layer 48 as first layer 49 to be sealed off. The first layer 49 to be sealed off is the bipolar plate 10. A poling plate 51 is subsequently moved over the sealing material 42 comprising the particles 41 and an electric potential is applied between the poling plate 51 and the bipolar plate 10, so that a static electric field having a field strength in the range from $10^2$ to $10^6$ V/m is formed between the positively charged poling plate 51 and the bipolar plate 10 as negatively charged poling plate 52 comprising the applied sealing material 42. As an alternative, the field can also be an alternating electric field. The sealing material 42 as fluid medium is not yet cured in FIG. 9 and has such a viscosity that the particles 41 can perform a movement, in particular rotational movement, in the sealing material 52 and can, as depicted in FIG. 9, become oriented 59 in such a way that the imaginary planes 54 spanned by the particles 41 become oriented essentially perpendicular to the ideal diffusion direction 53. The sealing material 42 is subsequently cured 60, for example thermally or by means of irradiation. After curing 60 of the sealing material 42 comprising the oriented particles 41, the fuel cell unit 1 is assembled by a second layer 50 be sealed off being placed as bipolar plate 10 on the seal 11, i.e. the seal 11 is arranged 61 between two layers 49, 50 to be sealed off. As an alternative to the working example presented above, the sealing material 42 comprising the unoriented particles 41 can, as in the process step depicted in FIG. 8, be applied to a support layer 48 which does not function as future layer 49 to be sealed off, in particular is not a bipolar plate 10, so that after orientation of the particle 41 and curing of the sealing material 42 the seal 11 is removed from the support layer 48 and placed on a layer 49, 50 to be sealed off, in particular is arranged 61 between two layers 49, 50 to be sealed off.

In a further working example which is not depicted, the sealing material 42 comprising the particles 41 is, in a manner analogous to the above-described working example in FIG. 9, arranged in a magnetic field in order to orient the particles 41.

Overall, significant advantages are associated with the fuel cell unit 1 according to the invention and the process according to the invention for producing the fuel cell unit 1. Owing to the required properties of the sealing material 41, it is necessary to use sealing materials 42 having a relatively high coefficient of diffusion as sealing material 42 in the seals 11 because glass, for example, cannot be used as sealing material 42. The oriented particles 41 have a very small coefficient of diffusion and significantly increase the length of the diffusion path 38, so that the seal 11 has a significantly lower average coefficient of diffusion than in the case of a structure according to the prior art comprising only the sealing material 42 without the particles 41.

What is claimed is:

1. A fuel cell unit (1) as fuel cell stack (1) for electrochemically generating electric energy, the fuel cell unit comprising
fuel cells (2) each comprising a proton exchange membrane (5), an anode (7), a cathode (8), a gas diffusion layer (9), a bipolar plate (10),
at least one fluid channel (37) for passage of a fluid, and
at least one seal (11) composed of a sealing material (42) for sealing the at least one fluid channel (37),
wherein
particles (41) composed of a particle material (43) are arranged in the sealing material (42) of the at least one seal (11) in order to lengthen a diffusion path (38) of the fluid sealed off by the at least one seal (11),
wherein imaginary planes (54) spanned by the particles (41) are oriented within 5 degrees of perpendicular to an ideal direction of diffusion (53) in the at least one seal (11).

2. The fuel cell unit as claimed in claim 1,
wherein
a coefficient of diffusion of the particle material (43) of the particles (41) in the at least one seal (11) is smaller than a coefficient of diffusion of the sealing material (42).

3. The fuel cell unit as claimed in claim 1,
wherein
an aspect ratio of the particles (41) is greater than 1.

4. The fuel cell unit as claimed in claim 1,
wherein
the particles (41) have a platelet shape or needle shape.

5. The fuel cell unit as claimed in claim 1,
wherein
the particles (41) are anisotropic.

6. The fuel cell unit as claimed in claim 1,
wherein
the particle material (43) comprises a polarizable material and/or a material having a dipole nature so that the particles (41) overall have a dipole nature for orientation of the particles (41) in an electric field.

7. The fuel cell unit as claimed in claim 1,
wherein
the particle material (43) comprises a ferromagnetic material for orientation of the particles in a magnetic field.

8. The fuel cell unit as claimed in claim 1,
wherein
a maximum diameter (46) of the particles (41) is less than 1000 µm.

9. The fuel cell unit as claimed in claim 1,
wherein
a maximum diameter (46) of the particles (41) is greater than 5 µm.

10. The fuel cell unit as claimed in claim 1,
wherein
a ratio of a proportion by volume and/or a proportion by mass between the particle material (43) and the sealing material (42) is in a range from 1% to 95%.

11. The fuel cell unit as claimed in claim 1,
wherein
an aspect ratio of the particles (41) is greater than 2.

12. The fuel cell unit as claimed in claim 1,
wherein
a maximum diameter (46) of the particles (41) is less than 700 µm.

13. The fuel cell unit as claimed in claim 1,
wherein
a maximum diameter (46) of the particles (41) is greater than 10 µm.

14. The fuel cell unit as claimed in claim 1,
wherein
a ratio of a proportion by volume and/or a proportion by mass between the particle material (43) and the sealing material (42) is in a range from 3% to 80%.

15. A process for producing a fuel cell unit (1), comprising the steps:
provision of components (5, 6, 7, 8, 9, 10) for fuel cells (2),
provision of at least one seal (11) composed of a sealing material (42),
assembly of the components of the fuel cells (2) so that at least one fluid channel (37) is sealed by the at least one seal (11),
assembly of the fuel cells (2) to give the fuel cell unit (1), and
providing the at least one seal (11) with particles (41) composed of a particle material (43) being arranged in the sealing material (42) of the at least one seal (11) in order to lengthen a diffusion path (38) of the fluid sealed off by the at least one seal (11),
wherein imaginary planes (54) spanned by the particles (41) are oriented within 5 degrees of perpendicular to an ideal direction of diffusion (53) in the at least one seal (11).

16. The process as claimed in claim 15,
wherein
the particles (41) have a maximum diameter (46) in a first direction (44) and have a minimum diameter (47) in a second direction (45) and the first and second directions (44, 45) are oriented perpendicular to one another.

17. The process as claimed in claim 13,
wherein
the at least one seal (11) is arranged in the electric and/or magnetic field and the particles (41) perform movements in the sealing material (42) during arrangement of the at least one seal (11) in the electric and/or magnetic field.

18. The process as claimed in claim 16,
wherein
the sealing material (42) of the at least one seal (11) is cured after orientation of the particles (41) in the at least one seal (11).

19. A fuel cell unit (1) as fuel cell stack (1) for electrochemically generating electric energy, the fuel cell unit comprising
fuel cells (2) each comprising a proton exchange membrane (5), an anode (7), a cathode (8), a gas diffusion layer (9), a bipolar plate (10),
at least one fluid channel (37) for passage of a fluid, and
at least one seal (11) composed of a sealing material (42) for sealing the at least one fluid channel (37),
wherein particles (41) composed of a particle material (43) are arranged in the sealing material (42) of the at least one seal (11) in order to lengthen a diffusion path (38) of the fluid sealed off by the at least one seal (11),
wherein a coefficient of diffusion of the particle material (43) of the particles (41) in the at least one seal (11) is smaller than a coefficient of diffusion of the sealing material (42).

20. The fuel cell unit as claimed in claim 19, wherein the particle material (43) comprises a ferromagnetic material for orientation of the particles in a magnetic field.

* * * * *